United States Patent [19]
Stainton et al.

[11] Patent Number: 5,528,949
[45] Date of Patent: Jun. 25, 1996

[54] THREE-POSITION SHIFT ACTUATOR

[75] Inventors: John E. Stainton, Chorley; Philip A. Morris, Worsley, both of England

[73] Assignee: Eaton Corporation, Cleveland, Ohio

[21] Appl. No.: 180,151

[22] Filed: Jan. 11, 1994

[30]     Foreign Application Priority Data

Mar. 3, 1993 [GB] United Kingdom .................... 9304318

[51] Int. Cl.⁶ .................................................. F16H 61/28
[52] U.S. Cl. ............................................ 74/335; 74/336 R
[58] Field of Search ................................ 477/70; 74/335, 74/336, 745

[56]                  References Cited

U.S. PATENT DOCUMENTS

| | | | |
|---|---|---|---|
| 4,555,959 | 12/1985 | Braun | 74/335 X |
| 4,736,643 | 4/1988 | Richards | 74/339 |
| 4,748,863 | 6/1988 | McNinch | 74/477 |
| 4,788,875 | 12/1988 | Genise | 74/335 X |
| 4,899,607 | 2/1990 | Stainton | 74/335 |
| 4,930,081 | 5/1990 | Dunkley | 364/424.1 |
| 5,012,725 | 5/1991 | Leary | 74/335 X |
| 5,044,216 | 9/1991 | Steeby | 74/335 |

FOREIGN PATENT DOCUMENTS 405060229  3/1993  Japan ....................... 74/335

*Primary Examiner*—Khoi Q. Ta
*Attorney, Agent, or Firm*—Howard D. Gordon

[57]              ABSTRACT

A three-position actuator assembly for selectively shifting a three-speed splitter type auxiliary transmission section (14) is provided. The actuator assembly includes a piston portion (160) for axially moving a selected one of two shift forks (142/148) and a pneumatic control circuit (162) comprising three three-way, two-position solenoid controlled valves (202/204/206) and two three-way shuttle valves (214/216). Only one solenoid is energized for each selectable actuator position and a failure of the pneumatic (200) or electrical power sources to the control circuit will not cause the actuator to shift out of an engaged ratio.

10 Claims, 2 Drawing Sheets

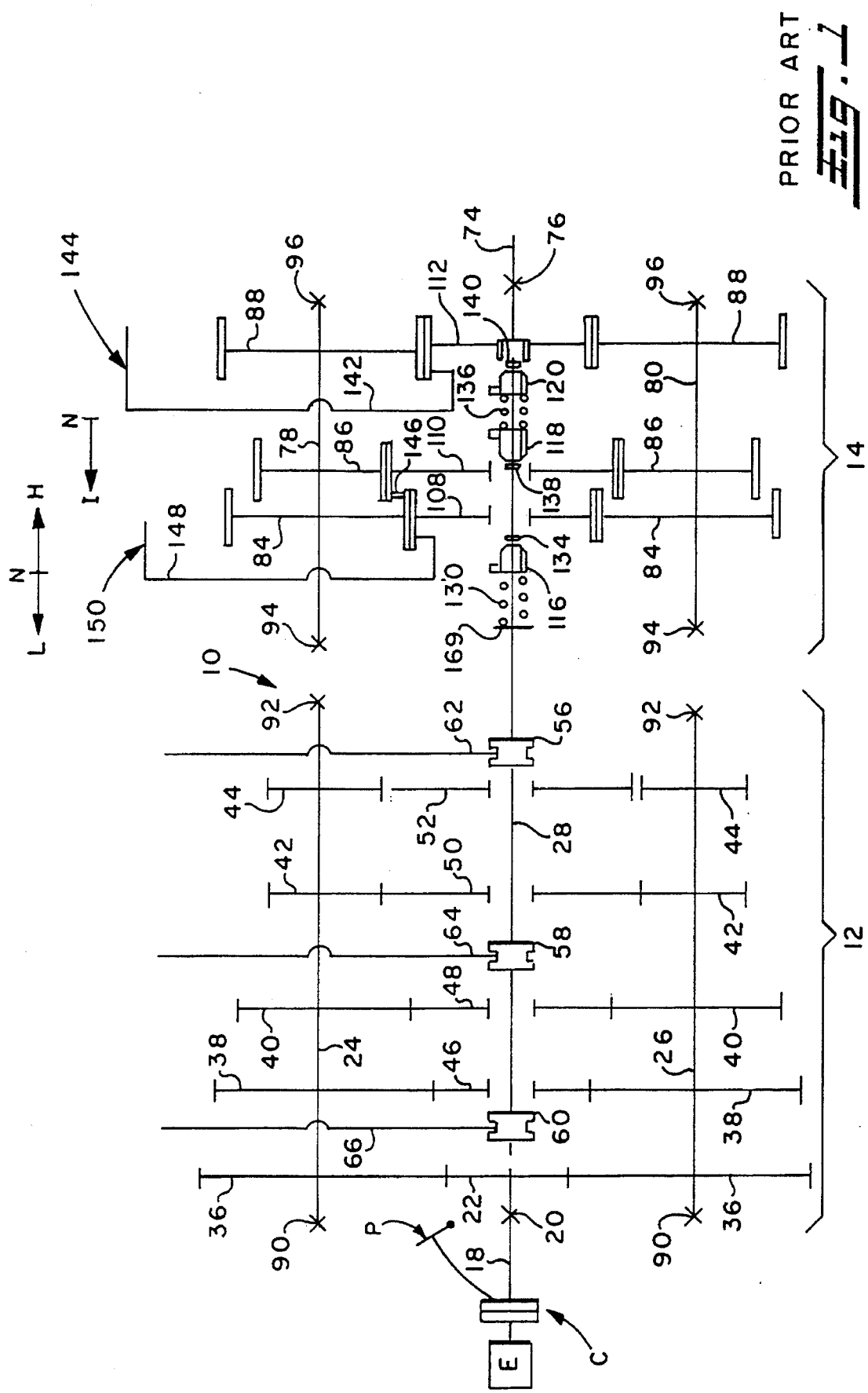

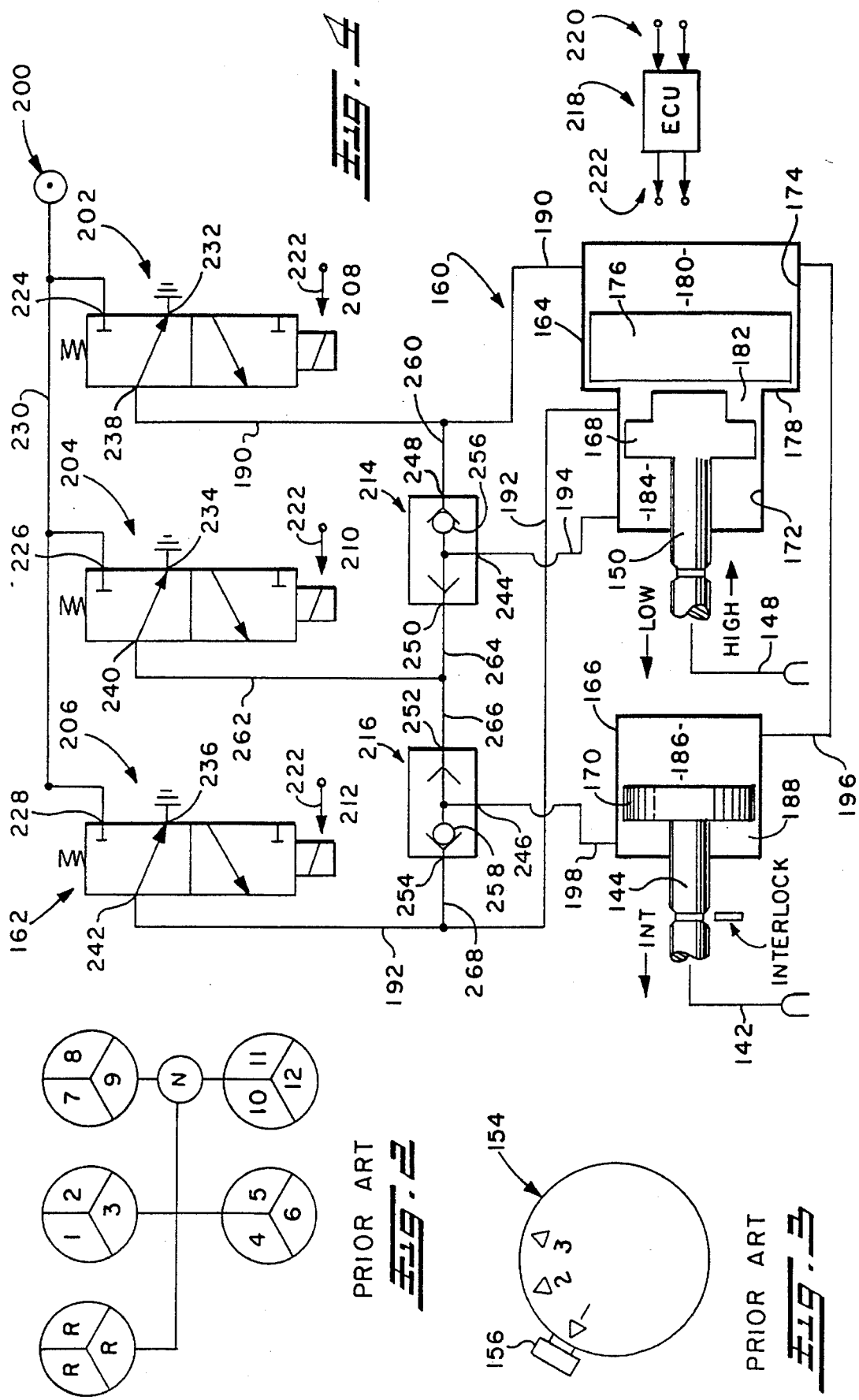

THREE-POSITION SHIFT ACTUATOR

BACKGROUND OF THE INVENTION

1. Field of Invention

The present invention relates to an electrically controlled, pressured fluid actuated, three-position actuator and, in particular, relates to a solenoid controlled pneumatic actuator for selectively causing engagement of a selected one of three selectable auxiliary section ratio gears in a vehicular compound mechanical transmission.

2. Description of the Prior Art

Compound mechanical transmissions having three-speed auxiliary sections, usually splitter type auxiliary sections, connected in series with a multiple speed main transmission section are well known in the prior art. An example of this type of transmission is sold by Eaton Corporation and its wholly-owned subsidiary, Eaton Limited, under the trademark "TwinSplitter" and is illustrated in U.S. Pat. No. 4,736,643, the disclosure of which is incorporated herein by reference.

Shifting actuators for such transmissions typically comprise a first shift fork controlled by a first, three-position piston having a centered nonengagement position and selectably displaceable in both axle directions to two selectable engagement positions and a second shift fork controlled by a second, two-position piston having a nondisplaced nonengagement position and selectably displaced to a single engaged position. An interlock assembly is provided to assure that only one shift fork is displaced from its nonengaged position at any given time. Actuator piston assemblies of this type may be seen by reference to U.S. Pat. No. 4,748,863, the disclosure of which is incorporated herein by reference.

The prior art devices, while providing their intended functions, were not totally satisfactory as they usually included differential area pistons which, for a given size of actuator, reduces the force available for some shifts which may be especially objectionable during cold start up conditions and usually included and air control system which would default to auxiliary section section neutral in the event of a solenoid and/or pneumatic power failure.

SUMMARY OF THE INVENTION

In accordance with the present invention, the drawbacks of the prior art are minimized or overcome in an auxiliary transmission section three-position actuator assembly allowing selective engagement of one of three selectable auxiliary section ratios which provides, for a given size actuator, increased gear selection/disengagement forces and which, in the event of an electrical or pneumatic power failure, will not shift the auxiliary section from its currently engaged state.

The above is accomplished by using all directly acting pistons, which will allow greater forces to be applied for a given size cylinder, and by using an air control circuit comprising three solenoid controlled three-way two position valves and two shuttle valves which allows direct, not differential area, piston actuation and which will not cause the actuator assembly to shift from an existing condition in the event of an electric or pneumatic power failure.

This and other objects and advantages of the present invention will become apparent from a reading of the detailed description of the preferred embodiment taken in connection with the drawings.

BRIEF DESCRIPTION OF THE DRAWINGS

FIG. 1 is a schematic illustration of a vehicular compound mechanical change gear transmission having a three-speed splitter type auxiliary section.

FIG. 2 is a schematic illustration of the shift pattern of the transmission of FIG. 1.

FIG. 3 is a schematic illustration of a shift lever knob used to manually shift the transmission of FIG. 1.

FIG. 4 is a schematic illustration of a shift actuator and shift actuator pneumatic control circuit of the present invention.

DESCRIPTION OF THE PREFERRED EMBODIMENT

Certain terminology will be used in the following description for convenience in reference only and will not be limiting. The words "upwardly", "downwardly", "rightwardly" and "leftwardly" will designate directions in the drawings to which reference is made. The words "forward" and "rearward" will refer respectively to the front and rear ends of the transmission as same is conventionally mounted in the vehicle, being respectively the left and right sides of the transmission as illustrated in FIG. 1. The words "inwardly" and "outwardly" will refer to directions toward and away from, respectively, the geometric center of the device and designated part thereof. Said terminology will include the words above specifically mentioned, derivatives thereof and words of similar import.

The term "compound transmission" is used to designate a transmission having a main transmission portion and an auxiliary transmission portion connected in series whereby the selected gear reduction in the main transmission portion may be compounded by further selected gear reduction in the auxiliary transmission port. The term "splitter type compound transmission" as used herein will designate a compound transmission wherein the auxiliary transmission is used to provide various selectable steps or subdivisions of the gear ratio selected in the main transmission port. In a splitter type compound transmission, the main transmission section is typically provided with relatively wide steps which are split or subdivided by the auxiliary section.

The term "directly acting piston" shall designate a piston having two opposed faces wherein when one face is exposed to pressurized fluid and the other face is exposed to an exhausted chamber.

Referring now to FIG. 1, there is illustrated a "4×3" twelve forward speed, semi-blocked, splitter type compound transmission 10 of the type illustrated in above-mentioned U.S. Pat. No. 4,736,643. Transmission 10 comprises a main section 12 connected in series with an auxiliary section 14, each of which have a plurality of selectable speeds, or power paths. The main and auxiliary sections are both suitably enclosed by conventional housing means (not shown).

The transmission 10 includes an input shaft 18 supported adjacent its rearward end by a beating 20 and is provided with an input gear 22 nonrotatably connected thereto, as by splines. The input gear 22 simultaneously drives a plurality of main section countershafts at equal speeds. In the illustrated embodiment, the transmission is provided with two main section countershafts, 24 and 26, disposed on diametrically opposite sides of the mainshaft 28, which mainshaft is coaxially aligned with the input shaft 18 and is provided with a pilot portion 30 on its forward end rotatably received within and supported by the rearward end of the input shaft 18.

The input shaft 18 is normally driven in one direction only by a prime mover, such as a throttle controlled Diesel engine E through a selectively operated, normally engaged, friction master clutch C. Clutch C may, when manually controlled, be selectively disengaged by use of pedal P as is known in the prior art. Clutch C may have a known clutch-brake associated therewith.

Each of the main section countershafts 24 and 26 is provided with an identical grouping of countershaft gears, such as the pair of gears 36, of identical size and number of teeth and disposed on diametrically opposite sides of the mainshaft 28. Countershaft gears 42 and 44 may be defined by involute splines formed directly on the main section countershafts.

A plurality of main section mainshaft drive gears 46, 48, 50 and 52 surround the mainshaft 28 and are selectably clutchable thereto, one at a time, by sliding clutch collars as is well known in the art.

The main section mainshaft gears 46, 48 and 50 encircle the mainshaft 28, are in continuous meshing engagement with, and are floatingly supported by the diametrically opposite pairs of countershaft gears, 38, 40 and 42, respectively, which mounting means and the special advantages resulting therefrom are explained in greater detail in U.S. Pat. Nos. 3,105,395 and 3,335,616, the disclosures of which are hereby incorporated by reference. The mainshaft gear 52 is the reverse gear and is in continuous meshing engagement with a pair of countershaft gears 44 by means of conventional intermediate idler gears (not shown). The forwardmost countershaft gears 36 are continually meshed with and driven by the input gear 22 for causing simultaneous rotation of the countershafts 24 and 26 whenever the input shaft is rotatably driven.

Main section mainshaft gears 46, 48, 50 and 52; and main section countershaft gears 36, 38, 40, 42 and 44, and the idler gears, are all constantly meshed with and driven by the input gear 22 and thus, in combination, form the input gearing of the transmission 10.

Sliding clutch collars 56, 58 and 60 are splined to mainshaft 28 for axial movement relative thereto and rotation therewith as is well known in the art.

Sliding clutch 56 is axially slidable by means of shift fork 62 to clutch gear 52 to the mainshaft. Sliding clutch 58 is axially slidable by means of shift fork 64 to clutch either gear 50 or 48 to the mainshaft. Sliding clutch 60 is axially slidable by means of shift fork 66 to clutch gear 46 to the mainshaft or to clutch the input gear 22 (and thus the input shaft 18) to the mainshaft. Shift forks 62, 64 and 66 are attached to shift bars or rails, (not shown) of a known shift bar housing assembly which is manually operated by a conventional shift lever. The present invention is also applicable to transmissions utilizing a remote mechanical, electrical or fluid shift mechanism in place of the shift bar housing and shift lever and also to fully or semi-automatic transmissions and transmission systems such is illustrated in U.S. Pat. Nos. 4,361,060 and 4,930,081, the disclosures of which are hereby incorporated by reference.

Considering now the splitter auxiliary section 14, the mainshaft 28 extends thereinto and is coaxially arranged with and piloted into an output shaft 74 which is in turn supported within the housing 16 by suitable bearings generally indicated at 76. Said auxiliary section further includes a plurality of auxiliary section countershafts 78 and 80 each having an identical grouping of countershaft gears 84, 86 and 88 therein.

As is known in the art and is illustrated in abovementioned U.S. Pat. No. 3,105,395, to minimize the axial and transverse dimensions of a twin countershaft type compound transmission, the mainshaft section countershafts, 24 and 26, are displaced about 90° from the auxiliary section countershafts. Main section countershafts are supported in housing 16 by bearings 90 and 92 while auxiliary section countershafts, 78 and 80, are supported in housing 16 by bearings 94 and 96.

Two auxiliary section mainshaft gears, 108 and 110, encircle the mainshaft 28 and are constantly meshed with and floatingly supported by the auxiliary countershaft gear pairs 84 and 86, respectively. Output gear 112 is splined to output shaft 74 for axial movement relative thereto and rotational movement therewith. Output gear 112 is constantly meshed with auxiliary countershaft gear pair 88.

Resiliently biased clutch members 116, 118 and 120 are splined to mainshaft 28 and, in combination with blockers (not shown) respectively, provide resilient, blocked clutching apparatus of the type described in above-mentioned U.S. Pat. Nos. 3,799,002, 3,921,469 and 3,924,484, the disclosures of which are incorporated herein by reference, for selectively clutching gears 108, 110 and 112, respectively, one at a time, to mainshaft 28. Clutch 116 is biased axially by spring 130 and limited in its axial movement by positive stop 134. Clutch members 118 and 120 are biased axially apart by spring 136 surrounding the mainshaft and limited in axial movement by stops 138 and 140.

Gear 112 is axially moved by shift fork 142 which is movable by shift rod 144. Mainshaft gears 108 and 110 are joined for joint axial movement and independent rotation by ring 146 and are axially movable by shift fork 148 movable by shift rod 150.

Control of the shift rods 144 and 150 is preferably, by a master control means, such as selector knob 154 (see FIG. 3) attached to the gear shift lever. Typically, master control selector knob 154 will include a movable member, such as button 156, or toggle lever, having three unique positions ("1", "2" and "3") by which one of the auxiliary section power paths, or speeds, ("Low", "Intermediate" or "High") may be selected. Typically, the auxiliary section master control 154, and the servo mechanism controlled thereby, is fluid and/or electrically operated and suitable master-slave valving and/or circuitry is provided.

The shift pattern for manual control of the transmission 10 is illustrated in FIG. 2.

The auxiliary section shift actuator assembly 160 and the pressurized fluid, preferably pneumatics, control circuit 162 for operation of same of the present invention may be seen by reference to FIG. 4.

The actuator assembly, which may be attached to or integral with the transmission housing, defines two generally parallel cylinders 164 and 166 in which are slidably and sealingly received actuator pistons 168 and 170, respectively, which are fixed for axial movements with rods 150 and 144, respectively. Cylinder 164 includes a smaller diameter portion 172 in which piston 168 is slidably received and a coaxial larger diameter portion 174 in which a centering piston 176 is slidably and sealingly received. A shoulder 178 is defined at the intersection of the larger and small diameter portions of cylinder 164.

As may be seen by reference to FIG. 1 and to above-mentioned U.S. Pat. No. 4,748,863, piston 168 is a three-position device having a centered position wherein gears 108 and 110 are both disengaged from shaft 28, a rightwardly displaced position (High) wherein gear 110 is engaged to shaft 28 and a leftwardly displaced position (Low) wherein gear 112 is engaged to shaft 28. Piston 170 is a two-position device having a rightward nondisplaced position wherein gear 112 and output shaft 74 is disengaged from shaft 28 and a leftwardly displaced position (Intermediate) wherein gear 112 and output shaft 74 are coupled to shaft 28. Interlock means are provided to prevent simultaneous displacement of both of the pistons.

Actuator piston 168 and centering piston 176 divides cylinder 164 into a rightward chamber 180, an intermediate chamber 182 and a leftward chamber 184. Piston 170 divides cylinder 166 into a rightward chamber 186 and a leftward chamber 188. Fluid conduits 190, 192, 194, 196 and 198, respectively, fluidly connect to the chambers 180, 182, 184, 186 and 188, respectively, for selectively pressurizing or exhausting same as will be described in greater detail below. As may be seen, fluid conduit 196 fluidly connects chamber 180 to chamber 186.

Leftward axial movement of enlarged centering piston 176 is limited by shoulder 178. When piston 176 is engaged with shoulder 178, and actuator piston 168 is engaged with piston 176, i.e., when chambers 180 and 184 are pressurized and chamber 182 exhausted, then piston 168 will be in its centered nondisplaced position and gears 108 and 110 will both be not engaged with shaft 28.

The relative axial positions of the pistons (and of the shift rods, shift forks and gears associated therewith) and the pressurization of the cylinder chambers, to achieve the three selectable positions of the auxiliary section shift actuator assembly 160 are illustrated below.

third ports fluidly communicate and a second position wherein the second port is sealed and the first and third ports communicate. The solenoid controlled valves are all biased to the first, exhausting positions thereof and respond to energization of their solenoids by moving to the second, pressurizing positions thereof.

Shuttle valves 214 and 216 each have three ports, a constantly open port, 244 and 246, respectively, and two controlled ports, 248 and 250, and 252 and 254, respectively. Referring to shuffle valve 214, as is known, shuffle element 256 will allow fluid to flow from ports 248 and/or 250 to port 244, from port 248 to port 244 but not to port 250, from port 250 to port 244 but not to port 248 and from port 24 to one but not both of ports 244 and 250. Shuttle element 258 provides a similar function for valve 216.

The third port 238 of solenoid controlled valve 202 communicates by fluid conduit 190 to cylinder chamber 180 and by fluid conduit 260, branching off conduit 190, to port 248 of shuttle valve 214. As mentioned above, chamber 180 fluidly communicates with cylinder chamber 186 by fluid conduit 196.

The third port 240 of solenoid controlled valve 204 communicates with port 250 of shuffle valve 214 and port 252 of shuttle valve 216 by fluid conduit 262 and branch conduits 264 and 266. The open ports 244 and 246 of the shuffle valves 214 and 216, respectively, communicate with cylinder chamber 182 and by branch conduit 268 with port 254 of shuffle valve 216. The open port 246 of shuttle valve

| SELECTABLE ACTUATOR POSITION | PISTON 168 POSITION | PISTON 170 POSITION | PISTON 176 POSITION | CHAMBER PRESSURIZATION | | | | |
|---|---|---|---|---|---|---|---|---|
| | | | | 180 | 182 | 184 | 186 | 188 |
| Low | L | R | R* | Ex | P | Ex | Ex | P |
| Intermediate | C | L | L | P | Ex | P | P | Ex |
| High | R | R | R | Ex | Ex | P | Ex | P |

*Not necessary.

The pressurized fluid, preferably pressurized air, control circuit 162 includes a pneumatic source 200, such an on-board air compressor, air cleaner and regulator, three solenoid controlled three-way two-position valves 202, 204 and 206 controlled by solenoids 208, 210 and 212 respectively and two three-way shuttle valves. A source of electric power (not shown), such as a vehicular electrical system, is provided to operate the solenoids.

In a manual system, the master control 154/156 will control energization and deenergization of the solenoids. In automated systems, an ECU 218 will receive input signals 220 and process same according to predetermined logic rules to issue command output signals 222 to various system actuators including the solenoids 208, 210, 212. ECU controls of this type may be seen by reference to U.S. Pat. No. 4,595,986, the disclosure of which is incorporated herein by reference.

Each of the solenoid controlled three-way valves, 202, 204 and 206, has a first port 224, 226, 228, respectively, connected to the pneumatic source 200 via conduit 230 which is normally pressurized to about 60-80 psi in a typical vehicle air system. Each of the valves 202, 204 and 206 also has a second port 232, 234 and 236, respectively, connected to an exhaust and a third port 238, 240 and 242, respectively, connected directly or indirectly to various ones of the piston chambers. Each of the solenoid controlled valves has a first position wherein the first port is sealed and the second and 216 communicates with fluid conduit 198 to cylinder chamber 188.

The relative energization of the solenoids 208, 210 and 212 to achieve the three selectable positions of the auxiliary section shift actuator assembly 160 are illustrated below.

| SELECTABLE ACTUATOR POSITION | SOLENOID 208 | SOLENOID 210 | SOLENOID 212 |
|---|---|---|---|
| Low | Off | Off | On |
| Intermediate | On | Off | Off |
| High | Off | On | Off |

To select Low, only solenoid 212 is energized. This will cause solenoid controlled valve 206 to move to its pressurizing position while solenoid controlled valves 202 and 204 will remain in their exhausting positions. Chamber 188 will be pressurized through conduit 192, conduit 268, shuttle valve 216 and conduit 198 while chamber 186 will be vented through conduit 196, chamber 180, conduit 190 and valve 202 causing piston 170 to move to or remain in its rightward nondisplaced position wherein gear 112 is disengaged and the interlock mechanism between rods 144 and 150 is released. Chamber 182 will be pressurized through conduit 192 while chamber 184 will vent through conduit 194 and shuttle valve 214 to solenoid valve 202 and/or solenoid controlled valve 204, causing piston 168 to move leftward to cause engagement or preselection of engagement of gear 108 to shaft 28. At this point, a failure of pneumatic power and/or of electric power to the solenoids will not create any force tending to cause disengagement of gear 108 from shaft 28.

To select Intermediate, only solenoid 208 is energized, causing valve 202 to assume the pressurizing position while valves 204 and 206 will remain in the venting positions thereof. Chamber 180 will be pressurized through valve 202 and conduit 190, chamber 184 will be pressurized through conduit 260, shuttle valve 214 and conduit 194, and chamber 182 will be vented through conduit 192 and solenoid controlled valve 206, which will cause piston 168, rod 150 and shift fork 148 to assume a centered nondisplaced position. Chamber 188 will be vented through conduit 198, shuffle valve 216 and one or both of solenoids controlled valves 210 and 212 while chamber 186 is pressurized from chamber 180 and conduit 196 to cause piston 170 to move leftwardly to select engagement of gear 112 and output shaft 74 to shaft 28. At this point, a failure of pneumatic and/or electric power to the solenoids will not create any force tending to cause disengagement of gear 112 from shift 28.

To select the High speed auxiliary section ratio, only solenoid 210 is energized causing valve 204 to assume the pressurizing position while valves 202 and 206 will remain in the venting positions thereof. Chamber 188 will be pressurized through valve 210, conduit 262, conduit 266, shuttle valve 216 and conduit 198 while chamber 186 will be vented through conduit 196, chamber 180, conduit 190 and valve 202. This will cause piston 170 to move to or remain in its rightward nondisplaced position wherein gear 112 is disengaged from shaft 28 and the interlock mechanism is released. Chamber 180 is vented through conduit 190 and valve 202, chamber 182 is vented through conduit 192 and valve 206 while chamber 184 is pressurized through valve 204, conduit 262, conduit 264, shuttle valve 214 and conduit 194, causing piston 168, piston 176, rod 150, shift fork 148 and gears 110 and 108 to move rightwardly to engage gear 110 to shaft 28. At this point, an electric or pneumatic power failure to the control circuit 162 will not result in any force tending to cause disengagement of gear 110.

In view of the above, it may be seen that an improved electrically controlled, fluid pressure actuated control system, preferably a three-position auxiliary section actuator control system for a splitter type compound mechanical transmission, has been provided that utilizes no constantly pressurized chambers and no differential area piston into gear actuation and that will prevent undesired and/or unexpected shifting of the actuator to the default position thereof upon an interruption of the source of pressurized fluid electrical power.

Although the present invention has been described in terms of which is presently believed to be the preferred embodiment, it will be apparent to those skilled in the art that various changes may be made without departing from the spirit and the scope of the invention as hereinafter claimed.

We claim:

1. A three-position actuator (160/162) assembly having a first selectable position (L) wherein a first shift fork, (148) is axially displaced in a first axial direction from an axially nondisplaced position (N) and a second shift fork (144) is in an axially nondisplaced position (N), a second selectable position (I) wherein said first shift fork is in an axially nondisplaced position (N) and said second shift fork is axially displaced in one axial direction from said axially nondisplaced position thereof, and a third position (N) wherein said first shift fork is axially displaced in a second axial position opposite said first axial position from said axially nondisplaced position and said second shift fork is in an axially nondisplaced position thereof, said actuator assembly characterized by:

a first cylinder (164) defining a smaller diameter portion (172) and an intersecting and coaxial larger diameter portion (174), said smaller diameter portion extending in said first axial direction from said larger diameter portion and a shoulder (178) defined at the intersection of said smaller and larger diameter portions, a centering piston (176) slidably and sealingly received in said larger diameter portion, a first actuator piston (168) slidably and sealingly received in said smaller diameter portion, said first shift fork axially movable with said first actuator piston, said centering piston and said enlarged portion defining a first chamber (180) to the second axial direction of said centering piston, said smaller and larger diameter portions and said centering and first actuator pistons defining a second chamber (182) axially between said centering and first actuator pistons, said first actuator piston and said smaller diameter portion defining a third chamber (184) to the first axial direction of said first actuator piston;

a second cylinder (166) having a diameter similar to the diameter of said smaller diameter portion, a second actuator piston (170) slidably and sealingly received in said second cylinder, said second shift fork axially movable with said second actuator piston, said second shift fork axially movable with said second actuator piston, said second cylinder and said second actuator piston defining a fourth chamber (186) to the other axial direction of said second actuator piston and a fifth chamber (188) to the one axial direction of said second actuator piston, said second actuator piston causing said second shift fork to assume the nonaxially displaced position thereof when fully displaced in the other axial direction in said second cylinder, and control circuit means (162) communicating with a source of pressurized fluid (200) and an exhaust to selectively pressurize and exhaust each of said chambers, said control circuit means effective (i) to select said first position of said actuator assembly by pressurizing said second and fifth chambers and exhausting said first, third and fourth chambers, (ii) to select said second position of said actuator assembly by pressurizing said first, third and fourth chambers and exhausting said second and fifth chambers, and (iii) to select said third position of said actuator assembly by pressurizing said third and fifth chambers and exhausting said first, second and fourth chambers.

2. The actuator assembly of claim 1 wherein said control circuit comprises first, second and third three-way, two-position independently controlled solenoid controlled valves (202, 204, 206) all having a (i) first port (224, 226, 228) connected to a source of pressurized fluid, (ii) a second port (232, 226, 228) connected to an exhaust and (iii) a third port (238, 240, 242) connected to at least one of said chambers, said valves all biased to an exhausting position wherein said first ports are sealed and said second and third ports are in fluid communication, energization of said solenoids effective to cause said valves to assume a pressurizing position wherein said second ports are sealed and said first and third ports are in fluid communication, only a selected one of said solenoids energized in each of said three selectable positions.

3. The actuator assembly of claim 2 wherein said control circuit (162) includes a first three-way shuttle valve (214) having an open port (244) connected (194) to said third chamber (184), a first controlled port (248) connected to said first chamber (180) and a second controlled port (250) and a second three-way shuttle valve (216) having a second open port (246) connected (198) to said fifth chamber (188), a third controlled port (252) connected (266, 264) to said second controlled port and a fourth controlled port (254) connected (192) to said second chamber (182), the third port (238) of said first solenoid controlled valve connected (190, 260) to said first chamber (180) and to said first controlled port (248), the third port (240) of said second solenoid controlled valve connected (262, 264, 266) to said second (250) and third (252) controlled ports, the third port (242) of said third solenoid controlled valve connected (192, 254) to said second chamber (99182) and said fourth controlled port (254).

4. The actuator assembly of claim 3 wherein said first position is selected by energizing said third solenoid controlled valve, said second position is selected by energizing said first solenoid controlled valve and said third position is selected by energizing said second solenoid controlled valve.

5. The actuator assembly of claims 1, 2, 3 or 4 wherein said shift forks are, in each of the axially displaced positions thereof, effective to cause engagement of a selected gear ratio of a three-speed auxiliary transmission section, 6. The actuator of claim 5 additionally comprising an interlock means to prevent simultaneous axial displacement of both of said shift forks.

7. The actuator assembly of claim 5 wherein said source of pressurized fluid is a pneumatic source.

8. The actuator assembly of claim 5 wherein said auxiliary transmission section is a splitter type auxiliary section (14) connected in series with a multiple speed main transmission section (12).

9. The actuator assembly of claim 8 wherein said first selectable position is effective to engage a low splitter ratio, said second selectable position is effective to engage an intermediate splitter ratio and said third selectable position is effective to engage a high splitter ratio.

10. The actuator of claims 1, 2, 3 or 4 additionally comprising an interlock means to prevent simultaneous axial displacement of both of said shift forks.

* * * * *